(12) United States Patent
Tsubusaki

(10) Patent No.: US 9,380,201 B2
(45) Date of Patent: Jun. 28, 2016

(54) IMAGE CAPTURE APPARATUS AND CONTROL METHOD THEREFOR

(75) Inventor: Akihiro Tsubusaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 574 days.

(21) Appl. No.: 13/554,860

(22) Filed: Jul. 20, 2012

(65) Prior Publication Data

US 2013/0027510 A1    Jan. 31, 2013

(30) Foreign Application Priority Data

Jul. 25, 2011    (JP) .................................. 2011-161971

(51) Int. Cl.
*H04N 5/232*    (2006.01)

(52) U.S. Cl.
CPC ........ *H04N 5/23212* (2013.01); *H04N 5/23258* (2013.01); *H04N 5/23287* (2013.01); *H04N 5/23296* (2013.01)

(58) Field of Classification Search
CPC .......... H04N 5/23212; H04N 5/23296; H04N 5/23287; H04N 5/23258; H04N 5/23209; H04N 5/23245; H04N 5/232; G02B 7/282; G02B 7/102
USPC ........................ 348/208.99–208.16, 345–357, 348/362–364, 36–39
See application file for complete search history.

(56) References Cited

U.S. PATENT DOCUMENTS

| | | | | |
|---|---|---|---|---|
| 7,551,847 B2 * | 6/2009 | Triteyaprasert | .......... | G03B 3/02 348/240.3 |
| 8,040,398 B2 * | 10/2011 | Yoshida | ............... | H04N 5/2628 348/240.1 |
| 2005/0012833 A1 * | 1/2005 | Yokota | ............... | H04N 5/23296 348/240.99 |
| 2006/0023091 A1 * | 2/2006 | Uchiyama | .............. | H04N 5/232 348/240.1 |
| 2008/0055429 A1 * | 3/2008 | Yoshida | ............... | H04N 5/2628 348/240.99 |
| 2009/0244325 A1 * | 10/2009 | Honjo | .................... | G02B 7/102 348/231.99 |
| 2010/0060781 A1 * | 3/2010 | Yumiki | .................. | G02B 7/102 348/345 |
| 2010/0208107 A1 * | 8/2010 | Nonaka | ................. | G06F 1/1626 348/240.99 |
| 2010/0208128 A1 * | 8/2010 | Yumiki | .................... | G02B 7/36 348/360 |
| 2010/0226635 A1 * | 9/2010 | Hirano | .................... | G02B 7/102 396/87 |

FOREIGN PATENT DOCUMENTS

| | | |
|---|---|---|
| JP | H08-018833 A | 1/1996 |
| JP | 2001-117153 A | 4/2001 |
| JP | 2003-337277 A | 11/2003 |
| JP | 2006-50019 A | 2/2006 |
| JP | 2007-316471 A | 12/2007 |
| JP | 2009-212804 A | 9/2009 |

* cited by examiner

*Primary Examiner* — Pritham Prabhakher
(74) *Attorney, Agent, or Firm* — Canon USA, Inc. I.P. Division

(57) ABSTRACT

When a first instruction operation is performed by a user, a controller changes a zoom position in a wide-angle direction. When a second instruction operation is performed by the user, the controller changes the zoom position, which has been changed in the wide-angle direction, in a telephoto direction. In association with the change in the zoom position in the telephoto direction, the controller causes the image capture unit to perform automatic image capture.

8 Claims, 7 Drawing Sheets

IMAGE CAPTURE APPARATUS AND CONTROL METHOD THEREFOR

BACKGROUND OF THE INVENTION

1. Field of the Invention

The present invention relates to an image capture apparatus having a framing assistance zoom function and a control method therefor.

2. Description of the Related Art

Among image capture apparatuses such as digital cameras, there are image capture apparatuses having an optical magnification (optical zoom) function in which magnification is performed by driving a zoom lens and an electronic magnification (electronic zoom) function in which a portion of a region of a captured image is magnified. In recent years, because of an improvement of the performance of zoom lenses, image capture can be performed using the same lens for the variety of states from a super wide-angle state to a super telephoto state. Furthermore, because of an increase in the number of pixels included in an image capture element, even when the magnification for zooming-in is increased, image capture can be performed so that a satisfying feeling of resolution can be achieved.

A so-called preset zoom function and a shuttle shot zoom function are known as functions of moving, at a high speed, a zoom position to a position corresponding to an angle of view at which image capture is desired to be performed. The preset zoom function is a function in which, by operating a switch with a photographer, the zoom position is moved from any zoom position to a zoom position that is stored in advance in a memory. Furthermore, the shuttle shot zoom function is an extension function of the preset zoom function, and includes a return function of returning the zoom position to the original zoom position. In other words, the photographer operates a switch, whereby the zoom position is moved from any zoom position to the zoom position stored in the memory. In this case, the original zoom position is stored in the memory. When a preset zoom operation finishes, the zoom position can be returned to the original zoom position.

In Japanese Patent Laid-Open No. 2006-50019, a control apparatus having the preset zoom function and the shuttle shot zoom function is disclosed. In this control apparatus, a memory zoom operation of changing from a first zoom state to a second zoom state can be performed. The first zoom state is a state in which the zoom position is located in one of an optical zoom region and an electronic zoom region, and the second zoom state is a state in which the zoom position is located in the other zoom region and which is stored in a storage unit. Furthermore, in an apparatus disclosed in Japanese Patent Laid-Open No. 2001-117153, a manual operation member that is used to select a storage operation or a reproduction operation is provided. The storage operation is an operation in which a zoom position is stored using the preset zoom function, and the reproduction operation is an operation of returning to the stored zoom position. The manual operation member can be operated by a finger different from a finger by which another manual operation member that is used to perform the operation selected by the manual operation member is operated.

Regarding image capture apparatuses having a zoom function with a super high magnification, in the case where such an image capture apparatus is in the super telephoto state and the angle of view is adjusted, even slight movement of a subject may cause the subject to go out of a frame. Furthermore, even a panning operation that is performed in a moment by a photographer who holds a camera leads to a large change in the range of the angle of view. As described above, in the case of the super telephoto state, there is an issue that it is difficult to perform framing so that a subject which is a moving body is placed within a frame at a desired angle of view.

In the case where the preset zoom function or the shuttle shot zoom function disclosed in Japanese Patent Laid-Open No. 2006-50019 and Japanese Patent Laid-Open No. 2001-117153 is used, after a photographer performs a manual operation of moving, once, the zoom position to a zoom position at which the photographer desires to perform image capture, the zoom position needs to be stored in a memory. For this reason, in the case where a moving subject that has gone out of a frame is followed and an image of the subject is captured or in the case where the size of an image of a subject has been changed, it takes time to update the details of the stored zoom position. Accordingly, the photographer may miss a shutter release opportunity. Moreover, in the related art disclosed in Japanese Patent Laid-Open No. 2001-117153, in order to capture an image of a subject so that the subject has a predetermined size in the captured image while following the subject which has gone out of a frame, the photographer needs to become familiar with a manual operation procedure. The reason for this is that it is necessary to store the zoom position while repeating a manual zoom operation using multiple manual operation members.

SUMMARY OF THE INVENTION

The present invention has been made in consideration of the above situation, and makes it possible for a photographer to, even when a subject has gone out of a frame, perform image capture at a desired angle of view while the photographer is immediately placing the subject within the frame again.

According to the present invention, provided is an image capture apparatus including an image capture unit and a controller. The image capture unit is configured to perform image capture. The controller is configured to change, when a first instruction operation is performed by a user, a zoom position in a wide-angle direction. When a second instruction operation is performed by the user, the controller changes the zoom position, which has been changed in the wide-angle direction, in a telephoto direction. In association with the change in the zoom position in the telephoto direction, the controller causes the image capture unit to perform automatic image capture.

Further, according to the present invention, provided is a control method for an image capture, the control method including the following: performing image capture with an image capture unit; and changing, when a first instruction operation is performed by a user, a zoom position in a wide-angle direction with a controller. The changing includes changing, when a second instruction operation is performed by the user, the zoom position, which has been changed in the wide-angle direction, in a telephoto direction with the controller. The performing includes performing, in association with the change in the zoom position in the telephoto direction, automatic image capture with the image capture unit.

Further, features of the present invention will become apparent from the following description of exemplary embodiments with reference to the attached drawings.

DESCRIPTION OF THE EMBODIMENTS

Preferred embodiments of the present invention will be described in detail in accordance with the accompanying drawings.

Embodiments of the present invention will be described below as first and second embodiments.

First Embodiment

Hereinafter, the first embodiment of the present invention will be described in detail with reference to the accompanying drawings. Note that a function that is realized by the present invention is a zoom function that assists a photographer in framing, and, for convenience sake, is referred to as a "framing assistance zoom function" (hereinafter, abbreviated as an "FA zoom function)".

Figure 1:
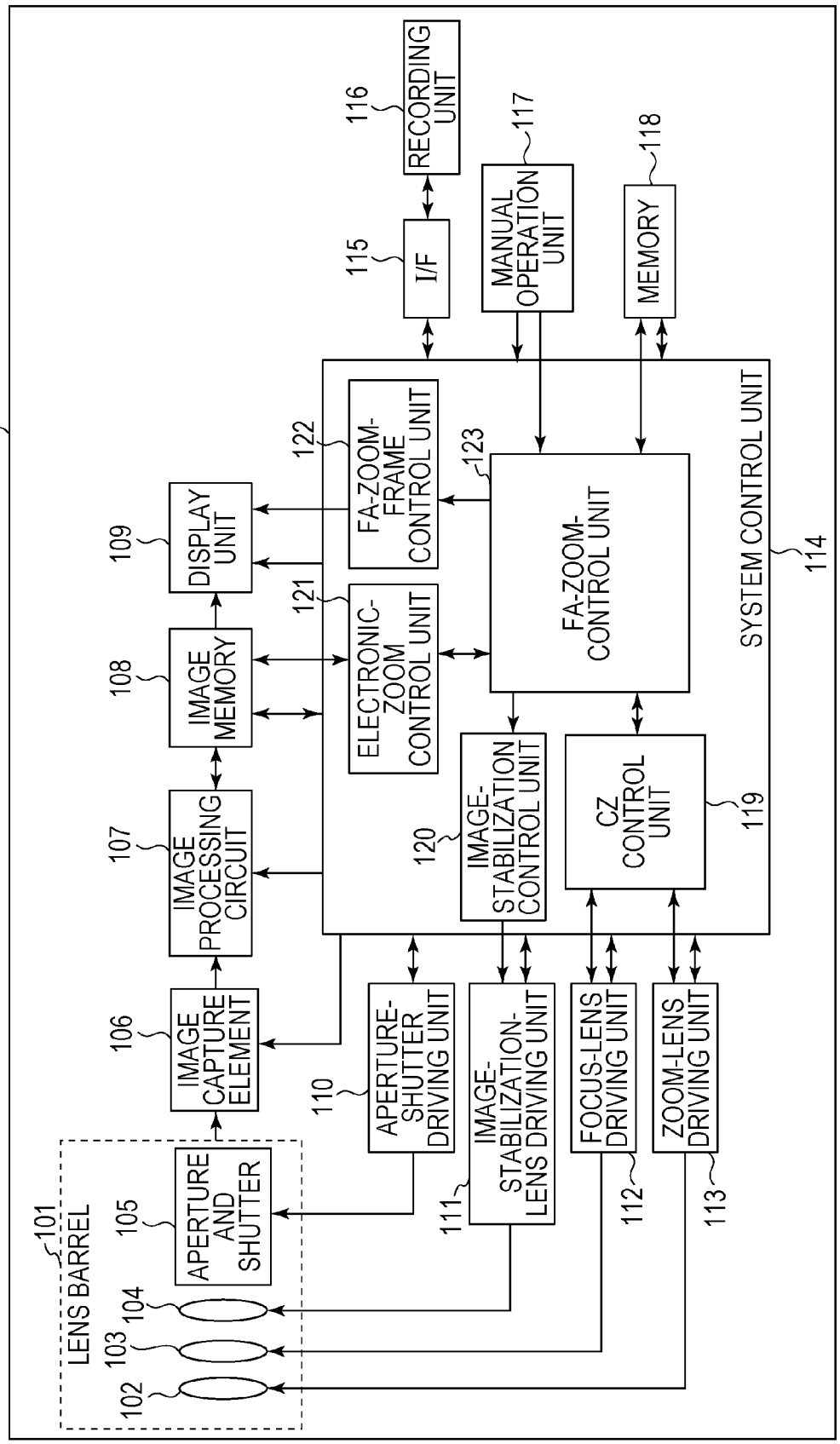
FIG. 1 is a block diagram illustrating an example of a configuration of a digital camera according to a first embodiment of the present invention.

FIG. 1 is a block diagram illustrating an example of a configuration of a digital camera 100 that is provided as an example of an image capture apparatus according to the first embodiment of the present invention. A lens barrel 101 holds a group of lenses therein, and the lenses are driven. Regarding a zoom lens 102, the focal length thereof is adjusted, whereby the angle of view is optically changed. Regarding a focus lens 103, the focus thereof is adjusted. An image stabilization lens 104 is a correction lens that corrects image shake caused by hand motion. An aperture and shutter 105 that adjust the amount of light are used for exposure control. Light that passes through the lens barrel 101 is received by an image capture element 106 using a charge coupled device (CCD), complementary metal-oxide semiconductor (CMOS), or the like, whereby an optical signal is obtained. The optical signal is converted into an electric signal. The electric signal is input to an image processing circuit 107, and subjected to a pixel interpolation process, a color conversion process, or the like. After that, the electric signal is transmitted as image data to an image memory 108. The image memory 108 is constituted by a dynamic random access memory (DRAM), a static random access memory (SRAM), or the like.

A display unit 109 is constituted by a thin film transistor (TFT) liquid crystal display (LCD) or the like, and displays specific information (for example, image capture information, an FA zoom frame that is described below, or the like), together with image data regarding a captured image. An electronic viewfinder (EVF) function that is used by the photographer to adjust the angle of view is realized by such display of information, e.g., a live view.

An aperture-shutter driving unit 110 calculates exposure control values (an aperture value and a shutter speed) on the basis of brightness information that is obtained by image processing performed by the image processing circuit 107, and drives the aperture and shutter 105 on the basis of a result of calculation, thereby performing automatic exposure (AE) control.

Regarding an image-stabilization-lens driving unit 111, the amount of shake that the digital camera 100 experiences is calculated by an image-stabilization control unit 120 from information obtained by an angular velocity sensor such as a gyroscope sensor, and the image-stabilization-lens driving unit 111 drives the image stabilization lens 104 so that the shake is cancelled.

A focus-lens driving unit 112 drives the focus lens 103. For example, under control using a contrast automatic focus (AF) method, the focus lens 103 is driven, on the basis of focus adjustment information (a contrast evaluation value) that concerns an image capture optical system and that is obtained by image processing performed by the image processing circuit 107, so that a subject is in focus. Note that, in application of the present invention, because any focus adjustment control can be used, a phase difference AF method or a method that is used in combination with another method may be employed. A zoom-lens driving unit 113 drives the zoom lens 102 in accordance with an instruction provided by a manual zoom operation. In a manual operation unit 117, a zoom lever, a zoom button, or the like is provided as a manual-zoom-operation member that is used by the photographer to provide an instruction instructing the camera to perform zooming. A zoom driving speed or a zoom driving direction is calculated on the basis of the amount of manual operation and the manual operation direction of the manual-zoom-operation member that has been used to provide the instruction by the manual zoom operation, and the zoom lens 102 is moved along the optical axis thereof in accordance with a result of calculation.

Image data that is generated by an image capture operation is transmitted to a recording unit 116 via an interface (I/F) unit 115, and recorded. The image data is recorded in an external recording medium, such as a memory card that is inserted into a camera and used, in a nonvolatile memory 118 that is built in the digital camera 100, or in both the external recording medium and the memory 118.

The manual operation unit 117 includes, in addition to the above-mentioned manual-zoom-operation member, for example, a release switch and an FA-zoom-operation switch. The release switch is used to provide an instruction to start normal image capture or to provide an instruction to perform automatic image capture after zooming-in has been performed, which is performed by the FA zoom function described below. The FA-zoom-operation switch is used to provide an instruction to start or finish the FA zoom function. The FA-zoom-operation switch corresponds to an instruction operation unit in the present invention. A manual-operation signal is transmitted to a system control unit 114 that serves as a controller and that is described below. The memory 118 stores, in addition to program data or the image data, setting information concerning settings of the digital camera 100, or information concerning a zoom return position and so forth that are used in the FA zoom function described below. Note that the zoom return position is a position to which a zoom position is returned when FA zooming finishes and which is a zoom position at the point in time when FA zooming started, and the details thereof will be described below.

The system control unit 114 is configured using an arithmetic unit such as a central processing unit (CPU), and transmits a control command to each of the sections in accordance with a manual operation performed by the photographer, thereby controlling the entire camera. The system control unit 114 executes various types of control programs stored in the memory 118, such as programs for performing control on the image capture element 106, AE/AF control, image stabilization control, zoom control (including an FA zoom process), and so forth.

Next, control associated with the FA zoom function out of control performed by the system control unit 114 will be described. Note that FIG. 1 illustrates a functional block in which internal processes performed by the system control unit 114 are represented by a computer-zoom control unit 119, the image-stabilization control unit 120, an electronic-zoom control unit 121, an FA-zoom-frame control unit 122, and an FA-zoom control unit 123.

Figure 2:
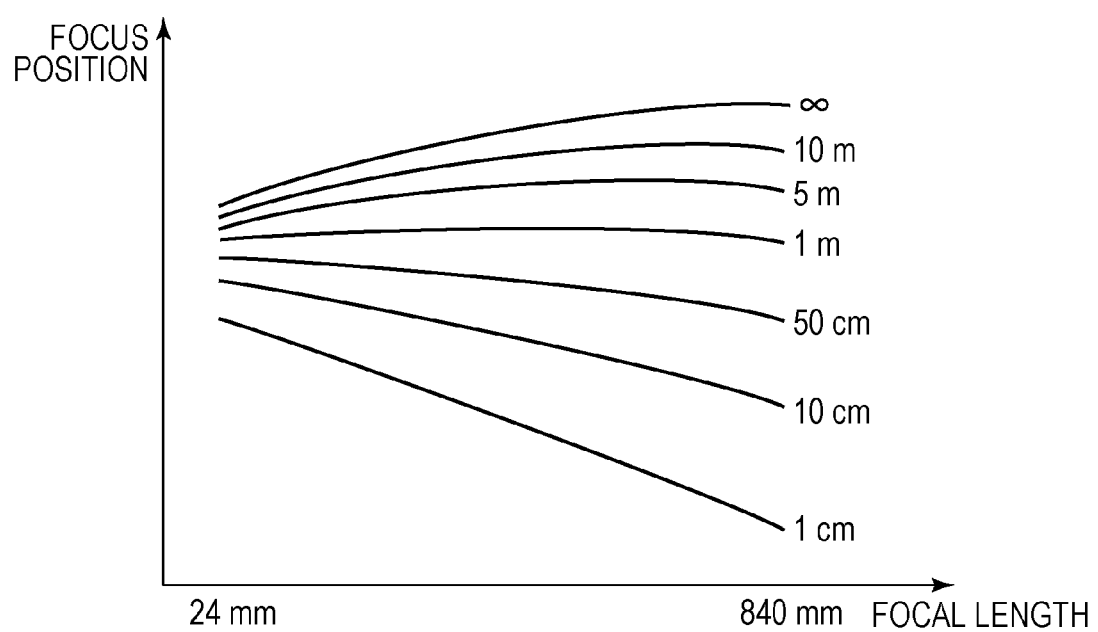
FIG. 2 is a graph illustrating an example of the relationships between a focal length and a focus position for each distance to a subject.

In order to maintain an in-focus state even when the angle of view is changed using optical zooming, in the case where a rear focusing barrel provided as the lens barrel 101 is used, the focus lens 103 needs to be moved to an appropriate focus position in accordance with the optical zoom position of the zoom lens 102. Such control is called computer zoom (CZ) control. FIG. 2 illustrates, as a graph, a data table indicating the relationships between the focal length of the zoom lens and the focus position at which the focus of the focus lens 103 is achieved for each distance to a subject. The table is referred to as a "focus cam table". The horizontal axis indicates the focal length corresponding to the optical zoom position, and the vertical axis indicates the focus position. A distance (a subject distance) from the camera to the subject is provided at the side of each line on the graph. During an AF operation, the system control unit 114 controls the focus-lens driving unit 112 so that the focus lens 103 is moved within a predetermined movement range, thereby performing a scanning operation. The focus position that is a focal point is detected by utilizing a known method using the contrast evaluation value or the like obtained during the scanning operation. The subject distance can be measured, using the optical zoom position at the point in time and the detected focus position, with reference to the focus cam table.

The digital camera 100 has an optical zoom function and an electronic zoom function. The CZ control unit 119 and the zoom-lens driving unit 113 are in control of optical zooming. The CZ control unit 119 detects the optical zoom position of the zoom lens 102 every predetermined control period during a zoom operation, and drives the focus lens 103 by following the focus cam table using the subject distance that has been measured by the AF operation in accordance with the detected optical zoom position. Accordingly, the zoom operation using optical zooming can be performed while the in-focus state is being maintained.

In contrast, the electronic-zoom control unit 121 and the image memory 108 are in control of electronic zooming. The electronic-zoom control unit 121 cuts out a target region from image data that has been transmitted to the image memory 108, thereby realizing the electronic zoom function. Furthermore, the range of the target region to be cut out is gradually increased every frame rate period for which images are captured by the image capture element 106, and the display unit 109 is caused to display the target region, thereby realizing smooth electronic zoom display.

Figure 3:
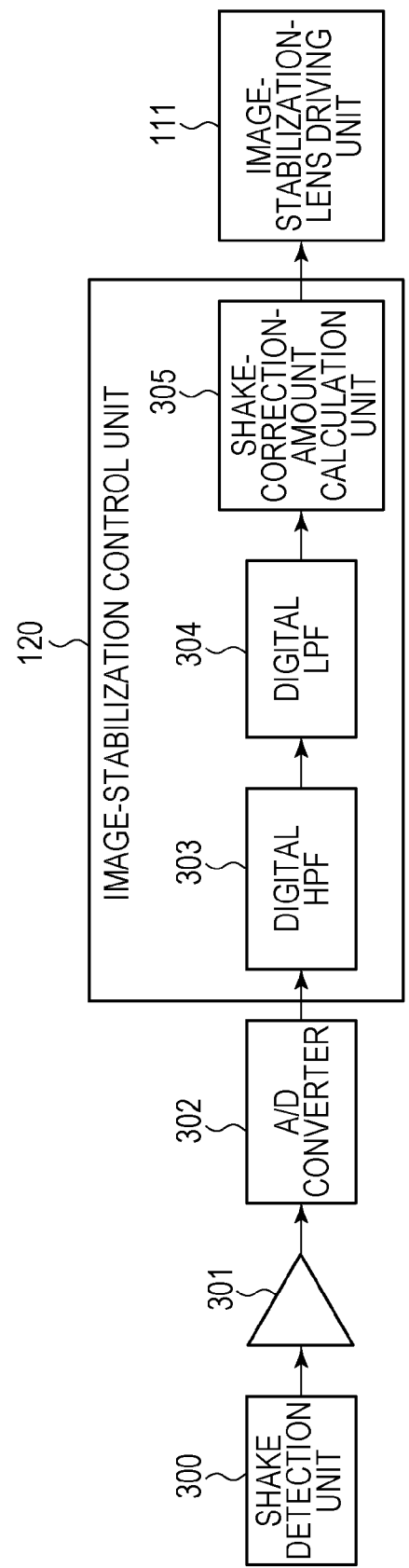
FIG. 3 is a block diagram illustrating a circuit configuration associated with an image-stabilization control unit.

The image-stabilization control unit 120 converts an angular velocity signal of an angular velocity sensor or the like into an angular signal that represents an amount of shake, and provides, for the image-stabilization-lens driving unit 111, a command to drive the image stabilization lens 104. FIG. 3 is a block diagram illustrating a circuit configuration associated with image stabilization control. An angular velocity sensor or the like is used as a shake detection unit 300. An amplifier 301 amplifies a shake signal (a shake output) that is output from the shake detection unit 300. An analog-to-digital (A/D) converter 302 converts the shake signal, which has been amplified, into a digital signal. A digital high-pass filter (HPF) 303 has a changeable cutoff frequency at which direct current (DC) elements are cut off. A digital low-pass filter (LPF) 304 is used to convert an angular velocity signal representing the shake signal into an angular signal. A shake-correction-amount calculation unit 305 calculates a shake correction amount for the image stabilization lens 104 from the shake signal. The digital HPF 303, the digital LPF 304, and the shake-correction-amount calculation unit 305 that constitute the image-stabilization control unit 120 are mainly realized by computation performed in the CPU. The cutoff frequency of the digital HPF 303 is changed in accordance with the amount of shake detected by the shake detection unit 300. In the case where the digital camera 100 experiences a large shake having a comparatively low frequency and the large shake is detected, the cutoff frequency is increased. Such a large shake is caused, for example, by a panning operation in which the photographer shakes the camera by a large amount or by vibration that occurs in the case where the zoom lens 102 is driven. Accordingly, the response of the image-stabilization control unit 120 is reduced, whereby the image stabilization lens 104 is driven so as to be positioned in the vicinity of the center as much as possible. Thus, the image-stabilization control unit 120 is prevented from responding to the large shake, and, the image stabilization lens 104 is prevented from being driven to the outside of a range in which the image stabilization lens 104 can be moved. Consequently, an image displayed in an electronic viewfinder (EVF) can be prevented from shaking by a large amount. When the amount of shake decreases, the cutoff frequency is gradually returned to the original low frequency. Although, by increasing the cutoff frequency, the image stabilization lens 104 is prevented from being driven to the outside of the range in which the image stabilization lens 104 can be moved, there is a problem that image stabilization performance is reduced during a time period for which the increased cutoff frequency is being used.

Next, an overview of the FA zoom function will be given, and the FA-zoom-frame control unit 122 and the FA-zoom control unit 123 will be described. In the related art, after a photographer has performed framing in the case of a tele-photo state so that a subject is placed within a frame, in the case where the subject has moved and has gone out of the frame while the photographer is waiting for a shutter release opportunity, the photographer needs to perform the following manual operations:

perform zooming-out by operating the manual-zoom-operation member and search the subject;

adjust the angle of view by performing the manual zoom operation so that the angle of view reaches a desired angle of view again; and provide an instruction to perform image capture by operating the release switch.

Figure 5:
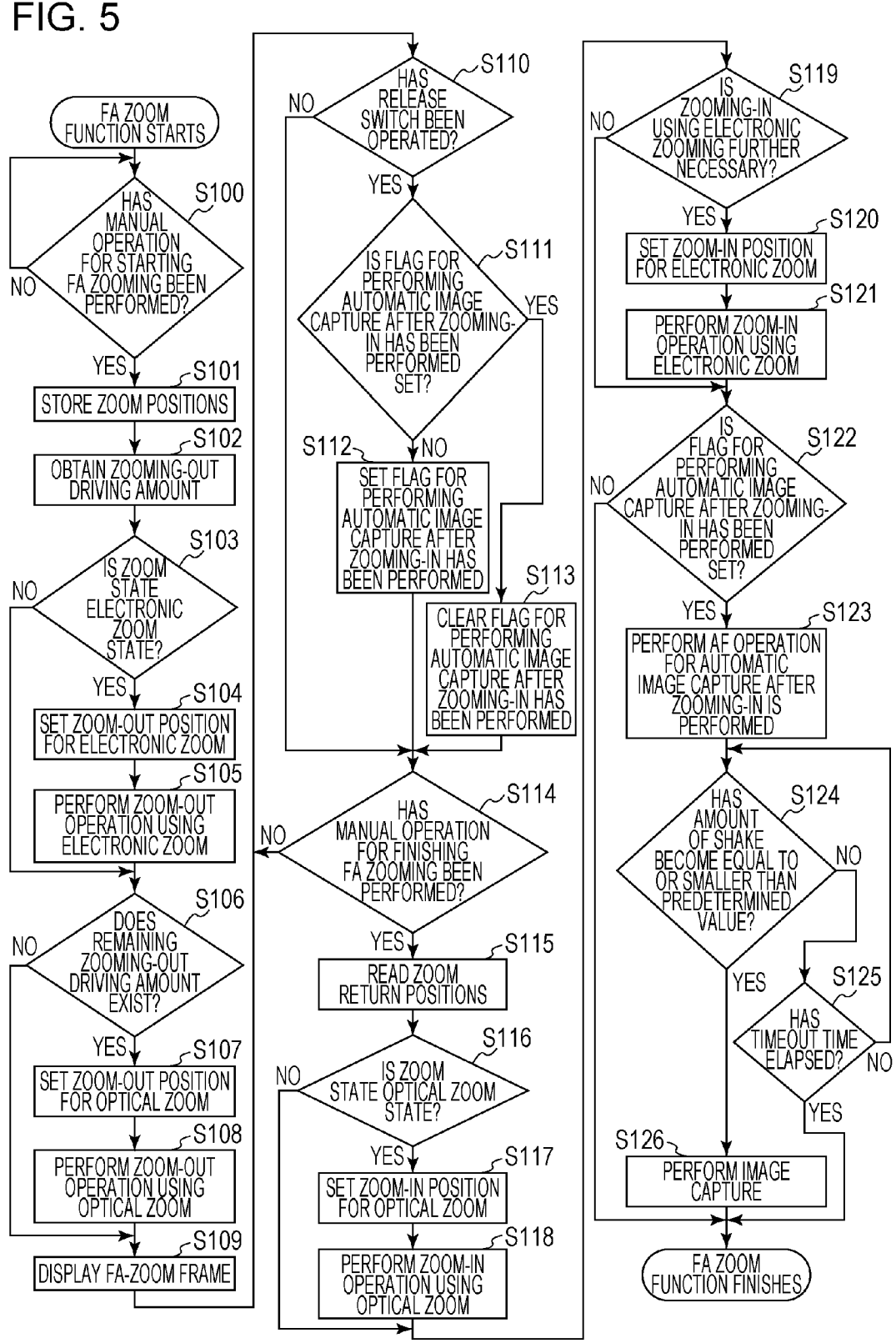
FIG. 5 is a flowchart for explaining an example of a process of a framing assistance zoom function in the first embodiment.

In contrast, with the digital camera 100 having the FA zoom function, in the case where the photographer loses a subject in a state (hereinafter, referred to as an "image-capture preparation state") in which adjustment of the angle of view or the like is being performed before image capture is performed, the photographer may operate the FA-zoom-operation switch. The FA-zoom-operation switch is a switch to which the FA zoom function is assigned. The FA-zoom-operation switch that is a member different from the manual-zoom-operation member is pressed to provide an instruction instructing the camera to start the FA zoom function. The FA-zoom control unit 123 stores, in the memory 118, an electronic zoom position and the optical zoom position at the point in time when the instruction to start the FA zoom function was output from the FA-zoom-operation switch. Furthermore, the FA-zoom control unit 123 provides an instruction instructing the CZ control unit 119 or the electronic-zoom control unit 121 to perform zooming-out by following a process procedure that is described below and that is illustrated in FIG. 5, and causes the digital camera 100 to enter a state (hereinafter, referred to as a "subject search state") in which the angle of view is made wider than that in the image-capture preparation state by performing zooming-out.

Figure 4B:
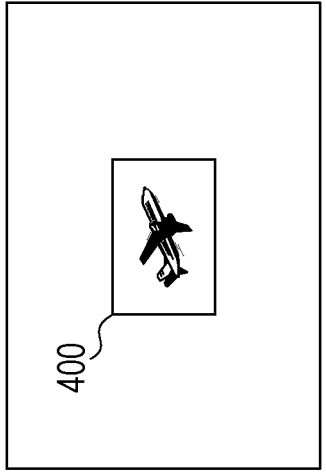
FIGS. 4A to 4D are diagrams illustrating an angle of view in the case of a zoomed-out state and an angle of view in the case of a zoomed-in state.
Figure 4D:
Figure 4A:
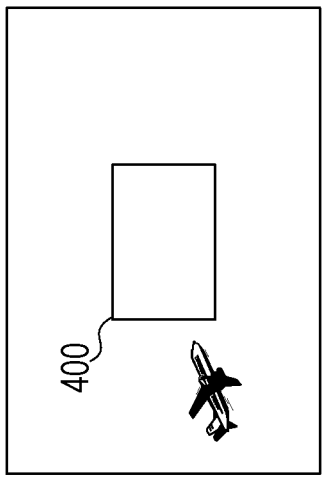
Figure 4C:
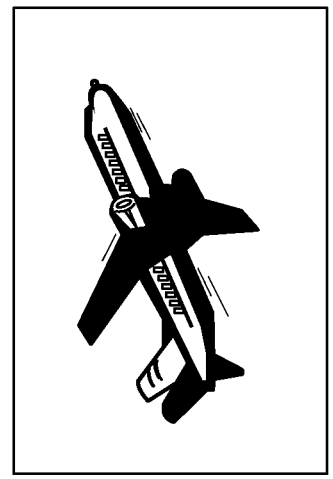

FIGS. 4A and 4B illustrate an angle of view in the case of a zoomed-out state, and FIGS. 4C and 4D illustrate an angle of view in the case of a zoomed-in state. As illustrated in FIGS. 4A and 4B, the FA-zoom-frame control unit 122 calculates a size representing a stored angle of view in the case of the image-capture preparation state, and causes the display unit 109 to display a frame, i.e., an FA-zoom frame 400, in a central portion of the EVF of the display unit 109. The size of the FA-zoom frame 400 is calculated on the basis of a zoom magnification at the point in time when zooming-out was performed. For example, when the digital camera 100 has been caused, by performing zooming-out with an electronic zoom magnification of two times and an optical zoom magnification of three times, to enter the subject search state from the image-capture preparation state, the FA-zoom frame 400 having a size that is ⅙ times, which is represented by an equation (½)×(⅓)=⅙, the original size is displayed for the angle of view displayed in the EVF in the subject search state.

The zoomed-out state is held while the FA-zoom-operation switch is being pressed. When the photographer finds a desired subject in the case of the subject search state (FIG. 4A), the photographer performs framing so that the subject is placed within the FA-zoom frame 400 which is used as a reference (FIG. 4B). After that, when the photographer releases the FA-zoom-operation switch to provide an instruction instructing the camera to finish FA zooming, the FA-zoom control unit 123 performs a zoom-in operation using electronic zooming or optical zooming so that the zoom position is changed to a stored zoom position in the case of the image-capture preparation state. In this manner, an optimally framed state illustrated in FIG. 4C is realized. Furthermore, when the release switch is operated in the case of the subject search state that is the zoomed-out state, an instruction to perform image capture immediately after the zoom-in operation has been performed can be provided. Because the camera automatically performs image capture after zooming-in has been performed, the subject is prevented from going out of the frame again, as illustrated in FIG. 4D, due to an image-capture time lag that occurs because the release switch needs to be operated.

Here, the AF operation during automatic image capture that is performed after zooming-in has been performed after FA zooming has finished will be described. In a situation in which the FA zoom function can effectively be used, it is supposed that a subject whose image is desired to be captured is positioned a certain distance from the camera and the certain distance is close to infinity. For this reason, in the AF operation during automatic image capture that is performed after zooming-in has been performed, the scanning operation is performed only in a small movement range near infinity, or the focus lens 103 is moved to a position corresponding to infinity without performing the scanning operation, whereby the image-capture time lag can be reduced. As a method for calculating a scan range, for example, a method is conceivable, in which, supposing that the distance to the subject is equal to or larger than a certain distance, a minimum scan range (a movement range) is calculated from the focus cam table illustrated in FIG. 2 and the depth of field (a range in which the in-focus state can be achieved when the focus lens is located at the same focus position).

Next, an image stabilization operation during automatic image capture that is performed after zooming-in has been performed will be described. When the shake detection unit 300 detects a shake caused by a zoom-motor vibration that occurs in the case where the zoom-in operation is performed by the FA zoom function or caused by hand motion that occurs in the case where a manual zoom-in operation is performed and the amount of shake is equal to or larger than a predetermined amount, the digital HPF 303 of the image-stabilization control unit 120 is controlled so that the cutoff frequency is increased. In the case where automatic image capture is performed after zooming-in has been performed, there is a risk that the optimum image stabilization performance cannot be achieved when the image capture is performed in a state in which the cutoff frequency is high. More specifically, in the case where zooming-in is performed and, then, image capture is performed in a super telephoto state, a large influence of hand motion is exerted. In the case where image capture is performed in a state in which image stabilization performance is reduced, there is a high probability that an unsuccessful image on which hand motion is exerted will be captured. For this reason, in the case where the system control unit 114 provides a command to perform automatic image capture after zooming-in has been performed, the system control unit 114 obtains, from the shake detection unit 300, the amount of shake caused by hand motion, and performs determination of the amount of shake. When the amount of shake is equal to or smaller than a predetermined value, the system control unit 114 controls the image capture element 106 and the aperture-shutter driving unit 110, and performs image capture. These processes enable the photographer to, by performing a simple manual operation, capture an image of a subject at a desired angle of view while placing the subject within a frame again after the subject has gone out of the frame.

Next, an example of a process of the FA zoom function will be described with reference to FIG. 5.

In step S100, the FA-zoom control unit 123 determines whether or not the FA-zoom-operation switch of the manual operation unit 117 is pressed in the case of the image-capture preparation state. When it is detected that the FA-zoom-operation switch is pressed, the FA zoom process starts.

In step S101, the FA-zoom control unit 123 obtains, from the CZ control unit 119, the optical zoom position in the case of the image-capture preparation state, and obtains the electronic zoom position from the electronic-zoom control unit 121. Furthermore, the FA-zoom control unit 123 stores data regarding the optical zoom position and the electronic zoom position in the memory 118. Note that the optical zoom position indicates the position of the zoom lens 102 that corresponds to the optical zoom magnification which can be changed by the optical zoom function, and the electronic zoom position indicates a control position that corresponds to the electronic zoom magnification which can be changed by the electronic zoom function and with which an image is zoomed in or zoomed out.

In step S102, the FA-zoom control unit 123 obtains a zooming-out driving amount that is stored in the memory 118. The zooming-out driving amount can be changed by a manual operation performed by the photographer on a setting menu. In this case, the manual operation unit 117 and the display unit 109 correspond to a setting unit that sets the zooming-out driving amount. In this example, a zoom-out operation, which is described below, is performed using the zooming-out driving amount that is set in advance. However, a configuration in which the FA-zoom control unit 123 controls the zoom-out operation in a step-by-step manner, a configuration in which the zoom-out operation is continued until the photographer performs a manual stop operation, or the like may be used.

In step S103, the FA-zoom control unit 123 determines whether or not a zoom state in the case of the image-capture preparation state is an electronic zoom state. In a typical manual zoom operation, when the manual-zoom-operation member of the manual operation unit 117 is pressed, in the case where the optical zoom position is located between a wide-angle end and a telephoto end for optical zooming, optical zooming is controlled by the CZ control unit 119. In the case where the optical zoom position is located at the telephoto end for optical zooming and in which an instruction to further change the zoom position in a telephoto direction is provided by a manual operation, the electronic-zoom control unit 121 controls electronic zooming, whereby image capture can be performed in the super telephoto state. In order to provide consistency between the manual zoom operation performed by operating the manual-zoom-operation member and the zoom operation performed by the FA zoom function, in the case where the digital camera 100 is in the image-capture preparation state and the zoom state is the electronic zoom state, electronic zooming is preferentially controlled also in the zoom operation performed by the FA zoom function. In other words, whether or not the zoom position at the point in time when the process of storing the electronic zoom position and the optical zoom position was performed in the memory 118 is located within a zoom region of a zoom state to which a higher priority is assigned is determined. In this example, because electronic zooming is preferentially controlled, in step S103, whether or not the zoom position is located in an electronic zoom region is determined. When the zoom state at the point in time when FA zooming started is the electronic zoom state, the process proceeds to step S104. In step S104, using a method for calculating a zoom-out position, which is described below, the FA-zoom control unit 123 calculates a zoom-out position for electronic zooming from the electronic zoom position, which has been obtained in step S101, and the zooming-out driving amount, which has been obtained in step S102, and sets the zoom-out position for electronic zooming in the electronic-zoom control unit 121. In step S105, the FA-zoom control unit 123 provides an instruction instructing the electronic-zoom control unit 121 to perform a process of changing the zoom magnetization so that the zoom position is changed to the zoom-out position for electronic zooming, which has been set in step S104, in a wide-angle direction. The electronic-zoom control unit 121 performs the zoom-out operation using electronic zooming.

When it is determined in step S103 that the zoom position in the case of the image-capture preparation state is located in an optical zoom region or when the zoom-out operation using electronic zooming finishes in step S105, the process proceeds to step S106. In step S106, the FA-zoom control unit 123 determines whether or not zooming-out using optical zooming is further necessary. In other words, in the case where the set zooming-out driving amount has not been achieved by controlling only electronic zooming, the remaining zooming-out driving amount needs to be compensated with control of optical zooming (calculation of the remaining zooming-out driving amount will be described below). When it is determined that zooming-out using optical zooming is necessary, the process proceeds to step S107, and, when zooming-out using optical zooming is unnecessary, the process proceeds to step S109. In step S107, the FA-zoom control unit 123 calculates a zoom-out position for optical zooming from the optical zoom position and the zooming-out driving amount using the calculation method described below, and sets the zoom-out position for optical zoom in the CZ control unit 119. In step S108, the FA-zoom control unit 123 provides an instruction instructing the CZ control unit 119 to control optical zooming so that the zoom position is changed to the zoom-out position for optical zooming, which has been set in step S107. The CZ control unit 119 controls the zoom-lens driving unit 113 so as to perform the zoom-out operation using optical zooming in the wide-angle direction. Then, the process proceeds to step S109.

In step S109, the FA-zoom control unit 123 provides an instruction instructing the FA-zoom-frame control unit 122 to display the FA-zoom frame 400 with a zoom-out magnification, and causes the digital camera 100 to enter the subject search state.

In steps S110 to S113, a procedure of providing an instruction to perform automatic image capture after zooming-in has been performed and of cancelling the instruction is provided. In this example, an operation of providing an instruction to perform automatic image capture after zooming-in has been performed and an operation of cancelling the instruction are performed by operating the release switch of the manual operation unit 117 in the case of the subject search state. In other words, the release switch corresponds to an image-capture instruction unit and an image-capture-instruction cancelling unit of the present invention. The image-capture instruction unit is configured to provide, before an instruction to finish the FA zoom function is provided, an instruction to perform automatic image capture after zooming-in has been performed, and the image-capture-instruction cancelling unit is configured to cancel the instruction. Furthermore, a flag for performing automatic image capture after zooming-in has been performed is allocated in the memory 118. In the case where the FA-zoom control unit 123 provides an instruction to perform automatic image capture after zooming-in has been performed, the FA-zoom control unit 123 sets the flag for performing automatic image capture after zooming-in has been performed. In the case where the FA-zoom control unit 123 cancels the instruction to perform automatic image capture after zooming-in has been performed, the FA-zoom control unit 123 clears the flag for performing automatic image capture after zooming-in has been performed. Automatic image capture is switched between the state of being enabled and the state of being disabled by determining whether the flag is set or cleared after the after zooming-in has been performed. In step S110, whether or not the release switch of the manual operation unit 117 has been operated in the case of the subject search state is determined. When the release switch has been operated, the process proceeds to step S111, and whether or not the flag for performing automatic image capture after zooming-in has been performed is already set is determined. When the flag for performing automatic image capture after zooming-in has been performed is cleared (NO in step S111), the process proceeds to step S112, and the flag for performing automatic image capture after zooming-in has been performed is set. When the flag for performing automatic image capture after zooming-in has been performed is already set (YES in step S111), the process proceeds to step S113. The flag for performing automatic image capture after zooming-in has been performed is cleared, and the instruction to perform automatic image capture is cancelled.

In step S114, the FA-zoom control unit 123 determines whether or not the FA-zoom-operation switch of the manual operation unit 117 has been released and has been turned off in the case of the subject search state. When the FA-zoom control unit 123 detects that the FA-zoom-operation switch has been turned off, the FA-zoom control unit 123 starts an operation of finishing FA zooming in step S115 and thereafter. In step S115, the FA-zoom control unit 123 reads, from the memory 118, the data regarding the zoom return positions, which has been stored in step S101. In step S116, the FA-zoom control unit 123 determines whether or not the zoom state in the case of the subject search state is an optical zoom state. When the zoom state is the optical zoom state (YES in step S116), because zooming-in is to be performed by preferentially controlling optical zooming, the process proceeds to step S117. When the zoom state is the electronic zoom state (NO in step S116), because zooming-in is to be performed by controlling only electronic zooming, the process proceeds to step S119. In step S117, the FA-zoom control unit 123 sets, among the zoom return positions that have been read in step S115, the optical zoom position as a zoom-in position for optical zooming in the CZ control unit 119. In step S118, the FA-zoom control unit 123 provides an instruction instructing the CZ control unit 119 to drive the zoom lens 102 to the zoom-in position for optical zooming, which has been set in step S117, in the telephoto direction. The CZ control unit 119 controls the zoom-lens driving unit 113 so as to perform the zoom-in operation using optical zooming.

When it is determined in step S116 that the zoom position in the case of the subject search state is located in the electronic zoom region or when the zoom-in operation using optical zooming finishes in step S118, the process proceeds to step S119. In step S119, the FA-zoom control unit 123 determines whether or not zooming-in using electronic zooming is further necessary. When zooming-in using electronic zooming is necessary, the process proceeds to step S120. When zooming-in using electronic zooming is unnecessary, the FA-zoom control unit 123 causes the digital camera 100 to enter the image-capture preparation state, and finishes the process. In step S120, the FA-zoom control unit 123 sets, among the zoom return positions that have been read in step S115, the electronic zoom position as a zoom-in position for electronic zooming in the electronic-zoom control unit 121. In step S121, the FA-zoom control unit 123 provides an instruction instructing the electronic-zoom control unit 121 to perform a process of changing the zoom magnification so that the zoom position is changed to the zoom-in position for electronic zooming, which has been set in step S120, in the telephoto direction. The electronic-zoom control unit 121 performs the zoom-in operation using electronic zooming, whereby the zoom position is returned to the zoom return position.

In step S122, the FA-zoom control unit 123 reads, from the memory 118, the flag for performing automatic image capture after zooming-in has been performed, and determines whether or not automatic image capture is to be performed. When the flag for performing automatic image capture after zooming-in has been performed is set, the process proceeds to step S123. When the flag for performing automatic image capture after zooming-in has been performed is cleared, the FA-zoom control unit 123 finishes the process of the FA zoom function. In step S123, the FA-zoom control unit 123 drives the focus-lens driving unit 112 in the scan range that has been calculated using the above-mentioned calculation method, and performs the AF operation that leads to a reduction in the image-capture time lag. In step S124, in order to achieve the optimum image stabilization performance during automatic image capture, the FA-zoom control unit 123 obtains the amount of shake from the shake detection unit 300, and determines whether or not the amount of shake is equal to or smaller than the predetermined value. When the amount of shake is equal to or smaller than the predetermined value, the process proceeds to step S126. When the amount of shake exceeds the predetermined value, the process proceeds to step S125. In step S125, a time is measured until the amount of shake becomes equal to or smaller than the predetermined value in step S124. Determination of the amount of shake in step S124 and determination of the measured time in step S125 are repeated until a timeout time elapses. In the case where the amount of shake has not converged to any value that is equal to or smaller than the predetermined value even when the timeout time has elapsed, the FA-zoom control unit 123 finishes the FA zoom function without performing an image capture process. When it is determined in step S124 that the amount of shake is equal to or smaller than the predetermined value, in step S126, the FA-zoom control unit 123 causes the system control unit 114 to control the image capture element 106 and the aperture-shutter driving unit 110, thereby performing an image capture process. When it is determined in step S122 that the flag for performing automatic image capture after zooming-in has been performed is cleared or when it is determined in step S125 that the amount of shake has not converged before the timeout time elapses, the FA-zoom control unit 123 finishes the process of the FA zoom function.

Figure 6:
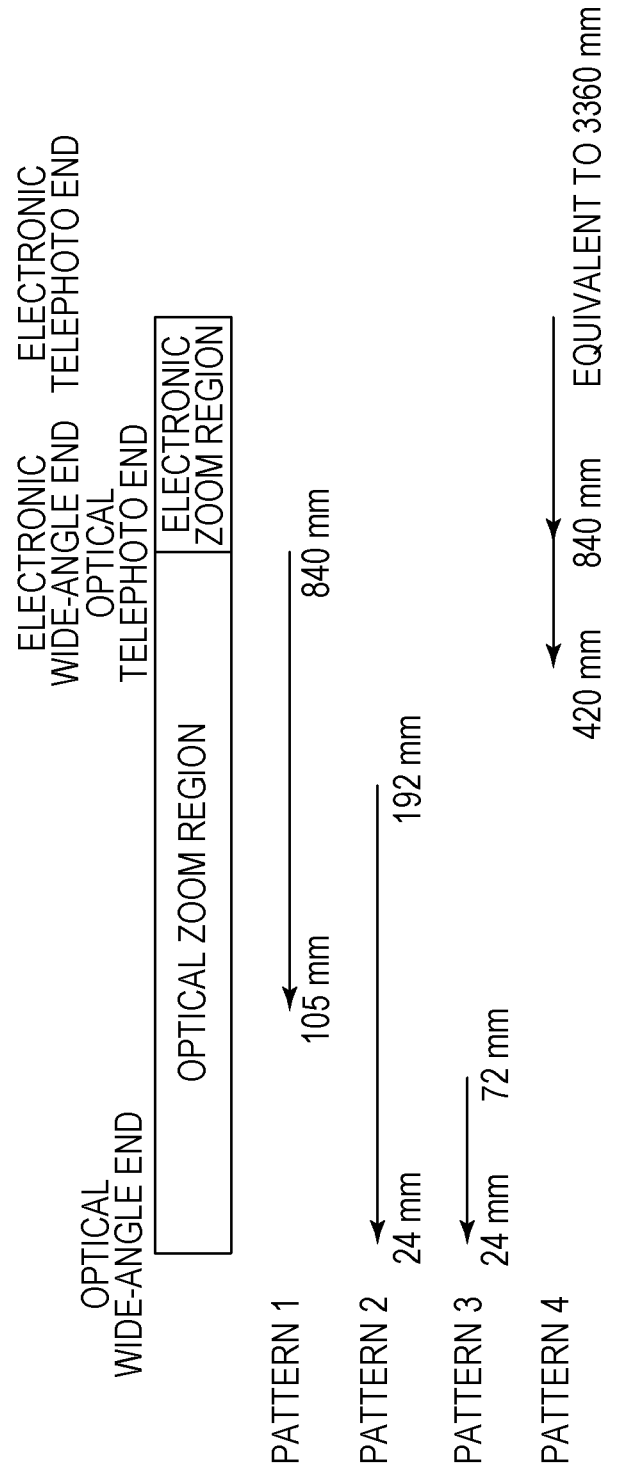
FIG. 6 is a diagram for explaining a method for calculating a zoom-out position for electronic zooming and a zoom-out position for optical zooming.

Next, the method for calculating the zoom-out position for electronic zooming and the zoom-out position for optical zooming, which have been set in step S104 and S107 illustrated in FIG. 5, respectively, will be described with reference to FIG. 6. FIG. 6 is a diagram illustrating examples of the zoom-out operation in the case where the zooming-out driving amount is set as a continuous amount based on the zoom magnification. In this example, it is supposed that, when the focal length for optical zooming ranges from 24 mm to 840 mm, the optical zoom magnification ranges up to thirty-five times, and the electronic zoom magnification ranges up to four times. It is supposed that the zooming-out driving amount is ⅛ times on a zoom-magnification basis. Note that, in FIG. 6, an "optical wide-angle end" and an "optical telephoto end" are a wide-angle end (a focal length of 24 mm) and a telephoto end (a focal length of 840 mm), respectively, that are used in the zoom operation using optical zooming, and represent the boundaries of the optical zoom region. An "electronic wide-angle end" and an "electronic telephoto end" are a wide-angle end (equivalent to a focal length of 840 mm) and a telephoto end (equivalent to a focal length of 3360 mm), respectively, that are used in the zoom operation using electronic zooming, and represent the boundaries of the electronic zoom region. The position of the optical telephoto end matches the position of the electronic wide-angle end.

In a pattern 1, a zoom-out position in the case where the digital camera 100 is in the image-capture preparation state and the zoom position is the position of the optical telephoto end corresponding to a focal length of 840 mm is provided. Because the zoom state in the case of the image-capture preparation state is the optical zoom state, the position of the electronic wide-angle end is still used as the electronic zoom position. When the optical zoom position is changed using a zooming-out driving amount corresponding to a zoom magnification of ⅛ times, a position corresponding to a focal length of 105 mm represented by an equation 840 mm×(⅛ times)=105 mm is used as the zoom-out position.

In a pattern 2, a zoom-out position in the case where the digital camera 100 is in the image-capture preparation state and the zoom position is an optical middle position corresponding to a focal length of 192 mm is provided. In this case, the position of the optical wide-angle end corresponding to a focal length of 24 mm represented by an equation 192 mm× (⅛ times)=24 mm is used as the zoom-out position for optical zooming.

In a pattern 3, a zoom-out position in the case where the digital camera 100 is in the image-capture preparation state and the zoom position is an optical middle position corresponding to a focal length of 72 mm is provided. As a result of calculation of a zoom-out position for optical zooming, a position corresponding to a focal length of 9 mm represented by an equation 72 mm×(⅛ times)=9 mm is obtained. The obtained position is located at the further wide-angle side of the position of the optical wide-angle end. In this case, the position of the optical wide-angle end is used as the zoom-out position.

In a pattern 4, a zoom-out position in the case where the digital camera 100 is in the image-capture preparation state and the zoom position is the position of the electronic telephoto end is provided. Because the electronic zoom magnification ranges up to four times, the position of the electronic wide-angle end is used as the zoom-out position for electronic zooming, and the zoom-out operation using optical zooming is performed for the remaining two times. Accordingly, a position corresponding to a focal length of 420 mm represented by an equation 840 mm×(½ times)=420 mm is used as the zoom-out position for optical zooming.

In the case where the zooming-out driving amount is set on the basis of the zoom magnification, except the case where the zoom-out position exceeds the position of the optical wide-angle end as in the pattern 3, an advantage is achieved, that the size of the FA-zoom frame in the case of the subject search state is fixed (angles of view in the case where zooming-out is performed are the same).

Note that, because calculation of the zoom-in position in step S117 or S120 illustrated in FIG. 5 is also performed using a method similar to the above-described method except that optical zooming is preferentially controlled, a description thereof is omitted.

Second Embodiment

Next, a second embodiment of the present invention will be described with reference to FIG. 7. In the first embodiment, by operating the release switch, an instruction to perform automatic image capture after zooming-in has been performed is provided and the instruction is cancelled. However, in the second embodiment, by determining whether a mode in which automatic image capture is performed after zooming-in has been performed is selected or not selected, an instruction to perform automatic image capture after zooming-in has been performed is provided and the instruction is cancelled. The others in the second embodiment are the same as those in the first embodiment.

Figure 7:
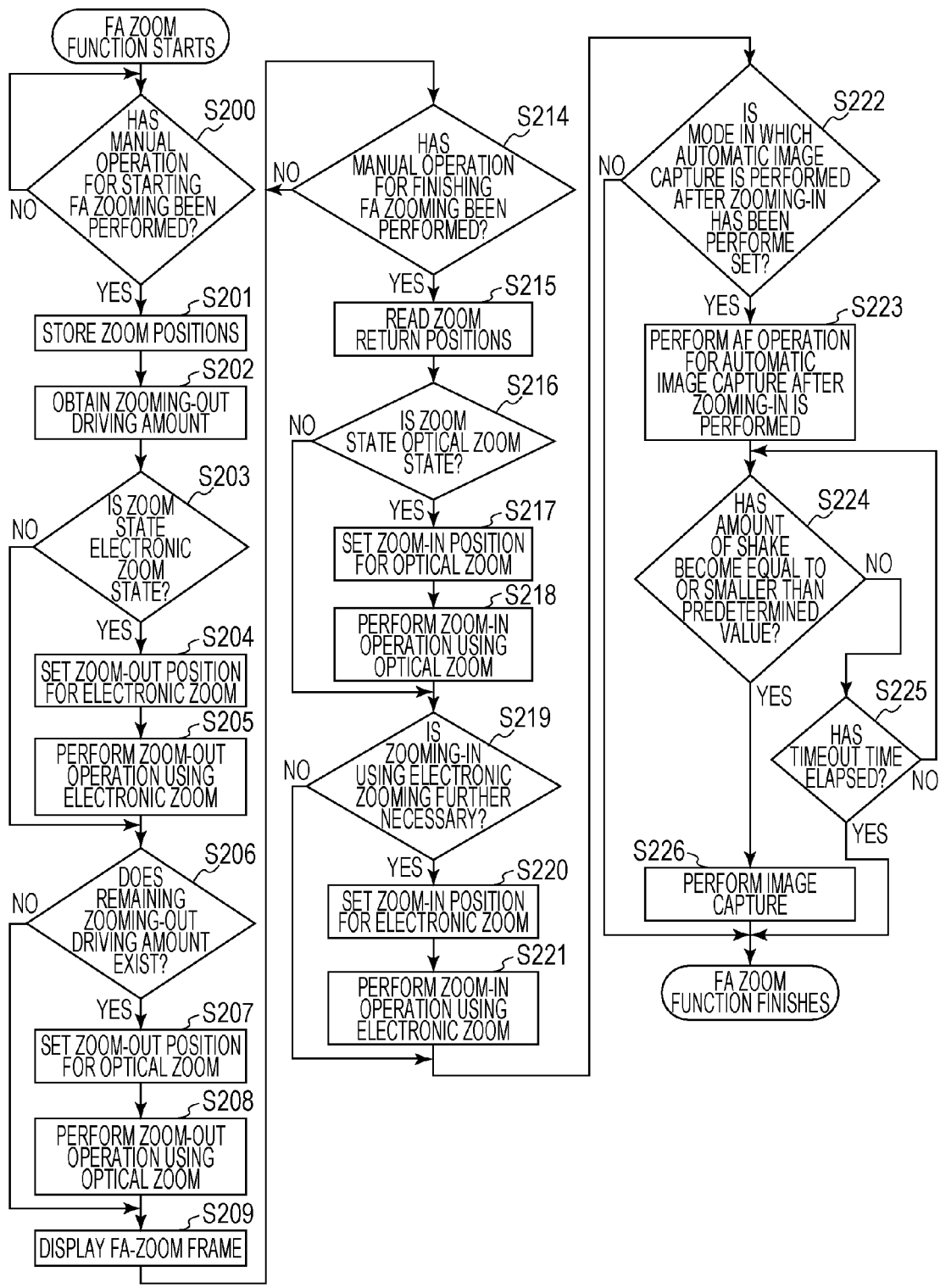
FIG. 7 is a flowchart for explaining an example of a process of the framing assistance zoom function in a second embodiment.

FIG. 7 is a flowchart illustrating a process of the FA zoom function. In the case of the image-capture preparation state, a manual menu operation is performed using a mode selection menu displayed on the display unit 109 and a manual operation switch or the like of the manual operation unit 117, whereby the mode in which automatic image capture is performed after zooming-in has been performed is selected.

Because the processes of steps S200 to S209 and S214 to S226 (excluding step S222) illustrated in FIG. 7 are the same as the processes of steps S100 to S109 and S114 to S126 (excluding step S122) illustrated in FIG. 5, a description thereof is omitted. In other words, in step S222, whether or not automatic image capture is to be performed is determined in accordance with whether or not the mode in which automatic image capture is performed after zooming-in has been performed is set. When the mode in which automatic image capture is performed after zooming-in has been performed is set, the process proceeds to step S223. When the mode in which automatic image capture is performed after zooming-in has been performed is not set, the FA-zoom control unit 123 finishes the process of the FA zoom function.

As described above, the preferred embodiments of the present invention have been described. However, various modifications and changes may be made without departing from the gist of the present invention. For example, in the above-described embodiments, as an instruction unit that provides an instruction to perform automatic image capture after zooming-in has been performed, an example is provided, in which an instruction to perform automatic image capture is provided by operating the release switch or by selecting, from the mode selection menu, the mode in which automatic image capture is performed after zooming-in has been performed. However, the instruction may be provided by operating a manual operation member other than the release switch. Furthermore, the instruction may be provided by changing a method for operating a switch, such as pressing of a switch for a long time period. Furthermore, in the above-described embodiments, an example is provided, in which all of the AF process for automatic image capture and the process of determining the amount of shake are performed in accordance with the instruction provided by the instruction unit which provides the instruction to perform automatic image capture. However, a configuration may be used in which some of the processes are selected and performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-161971, filed on Jul. 25, 2011, which is hereby incorporated by reference herein in its entirety.

What is claimed is:

1. An image capture apparatus comprising:
a memory;
a focus lens whose focus is adjustable and a focus control unit which controls a position of the focus lens,
a zoom control unit configured to change a zoom position by optical zooming using a zoom lens or electronic zooming;
a processor coupled to the memory which executes the following:
performing image capture using an image capture unit;
when a first instruction operation is performed by a user, storing, a current zoom position as a first zoom position in the memory and changing the zoom position using the zoom control unit in a wide-angle direction;
when a second instruction operation is performed by the user, changing the zoom position, which has been changed in the wide-angle direction, using the zoom control unit in a telephoto direction in accordance with the first zoom position which is stored,
wherein, subsequent to completion of the changing in the zoom position in the telephoto direction in accordance with the first zoom position which is stored, the processor executes automatic image capture using the image capture unit;
wherein a movement range in a case where automatic image capture is performed in association with the second instruction operation is reduced so as to be smaller than the movement range in a case where image capture is performed without performing the second instruction operation, the movement range being a range in which the focus lens is able to be moved, and wherein the focus control unit moves the focus lens and detects, using contrasts obtained at a plurality of positions, a position at which the focus is achieved.

2. The image capture apparatus according to claim 1, wherein the memory is configured to store the first zoom position, wherein the processor changes the zoom position using the zoom control unit, in the telephoto direction, to the first zoom position stored in the memory.

3. The image capture apparatus according to claim 2, wherein the first zoom position stored in the memory is a zoom position from which the zoom position is changed in the wide-angle direction.

4. The image capture apparatus according to claim 1, further comprising an image-capture instruction unit configured to provide an instruction to perform automatic image capture, wherein, when the instruction to perform automatic image capture has been provided by the image-capture instruction unit before the second instruction operation is performed, the processor causes the image capture unit to perform automatic image capture.

5. The image capture apparatus according to claim 4, further comprising an image-capture-instruction cancelling unit configured to cancel the instruction provided by the image-capture instruction unit, wherein, when the instruction has been cancelled by the image-capture-instruction cancelling unit before the second instruction operation is performed, the processor does not cause the image capture unit to perform automatic image capture.

6. The image capture apparatus according to claim 1, further comprising selecting, in association with the change in the first zoom position in the telephoto direction, whether or not automatic image capture is to be performed by the image capture unit.

7. The image capture apparatus according to claim 1, further comprising a shake detection unit configured to detect an amount of shake that the image capture apparatus experiences, wherein, when the amount of shake detected by the shake detection unit becomes equal to or smaller than a predetermined value, the processor causes the image capture unit to perform automatic image capture.

8. A control method for an image capture apparatus, the method comprising:

performing image capture with an image capture unit;

and when a first instruction operation is performed by a user, storing, in a memory, a current zoom position as a first zoom position, and changing a zoom position in a wide-angle direction with a zoom control unit by optical zooming or electronic zooming;

when a second instruction operation is performed by the user, changing the zoom position, which has been changed in the wide-angle direction, with the zoom control unit in a telephoto direction in accordance with the first zoom position which is stored in the memory, wherein, subsequent to completion of the changing in the zoom position in the telephoto direction in accordance with the first zoom position which is stored in the memory, automatic image capture is executed with the image capture unit, wherein a movement range in a case where automatic image capture is performed in association with the second instruction operation is reduced so as to be smaller than the movement range in a case where image capture is performed without performing the second instruction operation, the movement range being a range in which the focus lens is able to be moved, and wherein a focus control unit moves a focus lens and detects, using contrasts obtained at a plurality of positions, a position at which the focus is achieved.

* * * * *